United States Patent [19]

Fager et al.

[11] 3,864,492

[45] Feb. 4, 1975

[54] METHOD OF TREATING DEPRESSION USING 1,4'-DIHYDROXY-3-N-PENTYL-6,6,9-TRIMETHYL-6A,7,10,10A-TETRA-HYDRODIBENZO[B,D]PYRAN

[75] Inventors: Earl Elmer Fager, Lake Villa; Norman Earl Wideburg, Waukegan, both of Ill.

[73] Assignee: Abbott Laboratories, North Chicago, Ill.

[22] Filed: Mar. 21, 1974

[21] Appl. No.: 453,227

Related U.S. Application Data

[60] Continuation-in-part of Ser. No. 384,555, Aug. 1, 1973, abandoned, which is a division of Ser. No. 298,900, Oct. 19, 1972, Pat. No. 3,808,234.

[52] U.S. Cl. .............................................. 424/283
[51] Int. Cl. .............................................. A61k 27/00
[58] Field of Search ...................................... 424/283

[56] References Cited
UNITED STATES PATENTS
3,388,136   6/1968   Taylor.............................. 260/345.3

*Primary Examiner*—Stanley J. Friedman
*Attorney, Agent, or Firm*—Robert L. Niblack; Vincent A. Mallare

[57] ABSTRACT

The compound 1,4'-dihydroxy-3-n-pentyl-6,6,9-trimethyl-6a,7,10,10a-tetrahydrodibenzo[b,d]pyran, which can be prepared by microbial transformation of 1-hydroxy-3-n-pentyl-6,6,9-trimethyl-6a,7,10,10a-tetrahydrobidenzo [b,d]pyran. The compound is useful as an antidepressant agent.

3 Claims, No Drawings

METHOD OF TREATING DEPRESSION USING 1,4'-DIHYDROXY-3-N-PENTYL-6,6,9-TRIMETHYL-6A,7,10,10A-TETRAHYDRODIBENZO[B,D]PYRAN

CROSS-REFERENCE TO RELATED APPLICATIONS

This is a continuation-in-part of application U.S. Ser. No. 384,555 filed Aug. 1, 1973, now abandoned, which is a division of application U.S. Ser. No. 298,900, filed Oct. 19, 1972, now U.S. Pat. No. 3,808,234 issued Apr. 30, 1974.

DETAILED DESCRIPTION OF THE INVENTION

This invention relates to 1,4'-dihydroxy-3-n-pentyl-6,6,9-trimethyl-6a,7,10.10a-tetrahydrodibenzo [b,d]pyran and to methods for its preparation. The derivative is produced by microbial transformation of 1-hydroxy-3-n-pentyl-6,6,9-trimethyl-6a,7,10.10a-tetrahydrodibenzo[b,d]pyran with active cultures or resuspended washed cells.

The compounds of this invention is represented by formula I

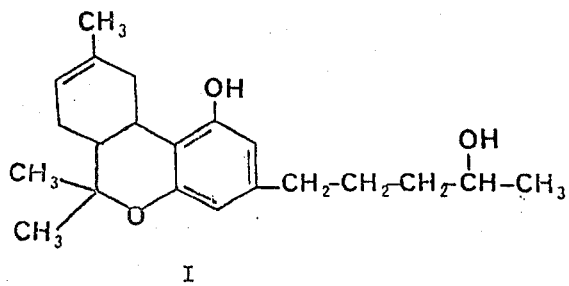

I

The compound is produced by subjecting 1-hydroxy-3-n-pentyl-6,6,9-trimethyl-6a,7,10,10a-tetrahydrodibenzo[b,d]pyran of formula II

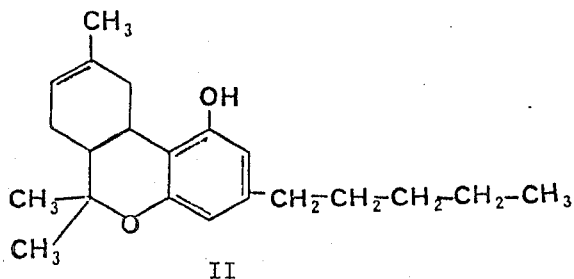

II to microbial transformation using a suitable microorganism.

1,4'-Dihydroxy-3-n-pentyl-6,6,9-trimethyl-6a,7,10,10a-tetrahydrodibenzo[b,d]pyran is useful as an anti-depressant angent at dosages of from 0.5 to 100 mg./kg. of body weight daily. The anti-depressant activity of the compound of this invention was first established in the modified dopa test [Everett, Fed. Proc. 23, p. 198 (1964)].

The microbiological hydroxylation can be accomplished by the following procedure: The microorganism is inoculated into a medium favorable to its growth. The inoculated fermentation medium is incubated at a favorable constant temperature with agitation on a rotary shaker. The substrate (II) is added to the fermentation after a heavy growth of mycelium has been obtained, usually within 48 hours after inoculation. The substrate, being a gum, can be dissolved in high concentration in acetone or other suitable solvents for transfer into the fermentation. The preferred level of substrate in the fermentation is between 0.05 and 1.0 g./liter. Incubation and agitation are continued after addition of the substrate as necessary for the microbiological hydroxylation.

Progress of the microbiological hydroxylation can be determined as follows: A 10 ml. aliquot of the whole culture is removed from the fermentation vessel and mixed with 10 ml. of acetone. Then the sample is extracted with 20 ml. of ethyl acetate. The extract is reduced to a residue and the residue is extracted with 2 ml. of acetone. A 100 $\mu$l. aliquot of the acetone solution is applied to a chromatographic plate precoated with a 0.25 mm. thick layer of silica gel GF-254. The chromatographic plate is developed with diethyl ether in a chromatography tank with a saturated atmosphere, open-faced or with a cover plate to form sandwich plate condition. The developed plate is dried of solvent and sprayed with a solution of Fast Blue B Salt (0.15 percent in water). The substrate and transformation products are visible as dark red spots on a white background. Substrate (II) is found at Rf 0.7–0.85 and the desired product (I) is found at Rf 0.40–0.45.

The fermentation is harvested at the time of maximum yield of the desired product. The desired product may be separated from the culture by extraction of the whole culture at an appropriate pH with a water immiscible solvent such as ethyl acetate or butanol, or with a mixture of solvents such as ethyl acetate and acetone. Alternatively, the whole culture may be filtered and the filtrate extracted with the solvents indicated and the mycelium cake extracted with water miscible solvents such as acetone, methanol or ethanol. The desired product in the residue, after evaporation of the extraction solvent, can be purified by chromatography.

The following examples further illustrate this invention:

EXAMPLE 1

Microbial Transformation of 1-Hydroxy-3-n-Pentyl-6,6,9-Trimethyl-6a7,10,10a-Tetrahydrodibenzo[b,d]-Pyran Molds, basidiomycetes and actinomycetes, which are known to have hydroxylated other compounds, were selected to test their capacity to hydroxylate 1-hydroxy-3-n-pentyl-6,6,9-trimethyl-6a,7,10,10a-tetrahydrodibenzo[b,d]pyran. The following media were prepared:

| Medium I for Molds and Basidiomycetes | | |
|---|---|---|
| Soy Fluff Flour | 5 | grams |
| Yeast Extract | 5 | grams |
| KH$_2$PO$_4$ | 2.3 | grams |
| K$_2$HPO$_4$ | 0.4 | grams | in 1 liter with deionized water, was adjusted to pH 6.5. Ten ml. aliquots were dispensed into 50 ml. size screw top glass tubes with stainless steel Morton closures and sterilized by autoclaving at 121°C. for 30 minutes. A 50 percent weight per unit volume glucose solution was autoclaved separately and added to the sterile ingredients in the fermentation vessel in the amount of 1 ml. of glucose solution to each 10 ml. of vessel contents to complete the medium.

| Medium II for Actinomycetes | | |
|---|---|---|
| Soy Bean Meal | 5 | grams |
| Sodium Chloride | 1 | gram |
| Yeast Extract | 2.5 | grams |
| K$_2$HPO$_4$ | 2.0 | grams |
| KH$_2$PO$_4$ | 1.0 | grams | in 1 liter with deionized water, was adjusted to pH 6.5 – 7.0. Ten ml. aliquots were dispensed into 50 ml. size screw top glass tubes with stainless steel Morton closures and sterilized by autoclaving at 121°C. for 30 minutes. A 50 percent weight per unit volume glucose solution was autoclaved separately and added to the sterile ingredients in the fermentation vessel in the amount of 1 ml. of glucose solution to each 10 ml. of vessel contents of complete the medium.

Tubes of complete sterile medium were inoculated in duplicate with one of the micro-organisms. One seven day old slant of each micro-organism was suspended as completely as possible in 5 ml. of sterile broth composed of 5 grams of glucose, 3 grams of peptone, 3 grams of beef extract, and 1 gram of yeast extract in 1 liter of deionized water and adjusted to pH 7.0. A 1 ml. portion of the broth suspension was used to inoculate each tube. The inoculated media were incubated at 28°C. on a rotary shaker at 250 rpm. The cultures showing heavy growth after 48 hours incubation, and the remaining few that required 72 hours incubation, received 5 mg. of substrate (II) in one of the tubes and the duplicate tubes served as a culture control without added substrate. The substrate was added as an aceton solution (50 mg./ml., 0.1 ml. per tube) and all of the cultures were re-incubated on the shaker for an additional 48 hours. Then each of the cultures was mixed with 10 ml. of acetone and 20 ml. of ethyl acetate, shaken vigorously to effect extraction, and centrifuged. The upper solvent phase from each tube was redueced to a residue and the residue was extracted with 2 ml. of acetone. Each acetone solution was applied at 100 μl. to a chromatographic plate precoated with a 0.25 ml. thick layer of silica gel GF-254. The plate was developed with diethyl ether, dried of solvent and sprayed with Fast Blue B salt reagent. Results are summarized in Table I following. This table lists cultures which yielded transformation products with an Rf of 0.40–0.45. The relative intensity of the red color produced by the reagent is indicated as barely visible (±), clearly visible (+) and more intense (++ or +++). The most intensely visible spot, indicated by (+++), represents a 2–4 percent conversion of substrate added to the fermentation. The code following the name of each organism designates the following:

| | |
|---|---|
| NRRL | means the culture is on deposit with and available from the Northern Utilization Research and Development Division, United States Department of Agriculture, Peoria, Illinois 61604. |
| ATCC | means the culture is on deposit with and available from the American Type Culture Collection, Rockville, Maryland 20852. |
| QM | means the culture is on deposit with and available from the Mycology Laboratory, U.S. Army Natick Laboratories, Natick, Massachusetts 01762. |

Codes other than any of these above three means the organism is from the Culture Collection at Abbott Laboratories, North Chicago, Illinois 60064.

TABLE I

| Organism | Medium Used | Substrate Rf | Yield of Product with RF .40–.45 |
|---|---|---|---|
| Aspergillus fonsecaeus NRRL 67 | I | .72 | + |
| Cunninghamella blakesleeana NRRL 1369 | I | .78 | +++ |
| Cunninghamella blakesleeana QM 631 | I | .75 | + |
| Cunninghamella elegans ATCC 9245 | I | .78 | ++ |
| Cunninghamella elegans (+) QM 6784 | I | .75 | ++ |
| Cunninghamella bainieri ATCC 9244 | I | .75 | ++ |
| Mucor parasiticus ATCC 6476 | I | .78 | ± |
| Absidia cylindrospora NRRL 2796 | I | .75 | + |
| Coprinus sclerotigenus NRRL 3306 | I | .78 | + |
| Streptomyces cinnamoneous NRRL B-1285 | II | .83 | + |
| Streptomyces viridoflavus NRRL B-1548 | II | .83 | + |
| Streptomyces cinereocrocatus NRRL 3443 | II | .83 | ± |
| Actinomycete sp. ACT-45 | II | .83 | + |

EXAMPLE 2

Microbiological Hydroxylation of 1-Hydroxy-3-n-Pentyl-6,6,9-Trimethyl-6a,7,10,10a,-Tetrahydrodibenzo[b,d]Pyran to 1,4'-Dihydroxy-3-n-Pentyl-6,6,9-Trimethyl-6a,7,10,10a,-Tetrahydrodibenzo[b,d]Pyran Cunninghamella blakesleeana NRRL 1369 was grown in 500 ml. Erlenmeyer flasks closed with cotton pluges. One hundred and ten flasks each containing 110 ml. of complete sterile Medium I, described in Example 1, were inoculated with a broth suspension of seven day old agar slants of the micro-organism, one agar slant suspension per flask. The inoculated medium was incubated at 28°C. on a rotary shaker at 250 rpm. Twenty-five mg. of substrate (II) in 0.5 ml. acetone was added to each flask after 48 hours incubation. The contents of all the flasks were combined after an additional 24 hours incubation and the whole culture was extracted with a 4 liter and a 2 liter portion of heptane and 4 times with 2 liter portions of ethyl acetate. Then the culture was filtered and the solids fraction was extracted another 6 times with 2 liter portions of acetone, allowing time for diffusion of the acetone solubles into the acetone. The greater portion of the desired product was found in these acetone extractions of the mycelium. All extracts containing significant amounts of the desired product were combined and the solvents were removed. The bulky oily residue, dissolved in heptane, was applied to a short, silica gel GF-254 column. Solvent mixtures of increasing polarity (by increasing ethyl acetate concentration in heptane) were used to elute materials from the column. The bulk of impurities were eluted with heptane and heptane:ethyl acetate (80:20) while the desired product was eluted in the latter portion of heptane:ethyl acetate (50:50). Final purification of the product was accomplished by preparative thin-layer chromatography on silica gel GF-254 developed with diethyl ether. The segment off silica gel containing the product was eluted with methanol, the eluate residue was extracted with heptane:chloroform to remove residual silica gel, the heptane:chloroform was removed and the residue was dried to yield 52.5 mg. of the desired pure product, as a gum.

The structure of the product was determined by proton magnetic resonance and mass spectrometry. High resolution mass spectrometry at 50 eV gave a molecular ion at m/e 330.2197 (calculated for $C_{21}H_{30}O_3$, 330.2195). The prominent fragment ions and their assignments are given in Table II. Comparison of these data with the mass specturm of 1-hydroxy-3-n-pentyl-6,6,9-trimethyl-6a,7,10,10a,-tetrahydrodibenzo[b,d]-pyran [H. Budzikiewicz et al., Tetrahedron, 21, 1881 (1965); U. Claussen et al., Tetrahedron, 22, 3535 (1966)] showed that the product was a monohydroxylated derivative of 1-hydroxy-3-n-pentyl-6,6,9-trimethyl-6a,7,10,10a-tetrahydrodibenzo[b,d]pyran. The peak at m/e 258 suggests that the position of hydroxylation is on the n-pentyl side chain. The exact position of hydroxylation was determined by proton magnetic resonance spectrometry. The spectrum was determined at 100 MHz in $CDCl_3$ with tetramethysilane as the internal standard. The chemical shifts are given in Table III. The assignments were made by analogy with the spectrum of 1-hydroxy-3-n-pentyl-6,6,9-trimethyl-6a,7,10,10a-tetrahydrodibenzo[b,d]pyran [R. A. Archer et al., J. Amer. Chem. Soc., 92, 5200 (1970)]. The only resonances present in the spectrum of the product and not present in the spectrum of 1-hydroxy-3-n-pentyl-6,6,9-trimethyl-6a,7,10,10a-tetrahydrodibenzo[b,d]pyran are the sextet at 3.82 ppm and the doublet at 1.18 ppm. These can arise only from the hydroxylation of the product at the 4'-position.

TABLE II

MASS SPECTRUM OF
1,4'-DIHYDROXY-3-n-PENTYL-6,6,9-TRIMETHYL-6a,7,10,10a-TETRAHYDRODIBENZO[b,d]PYRAN

| m/e | Relative Intensity | Assignment |
|---|---|---|
| 330 | 100 | M |
| 315 | 8 | M-$CH_3$ |
| 312 | 6 | M-$H_2O$ |
| 297 | 3 | M-$CH_3$$H_2O$ |
| 287 | 13 | M-$C_3H_7$ |
| 269 | 9 | M-$C_3H_7$-$H_2O$ |
| 262 | 11 | M-$C_5H_8$ |
| 258 | 23 | M-$C_4H_9O$ |
| 247 | 67 | 287-$C_3H_4$ 262-$CH_3$ |
| 245 | 67 | M-$C_5H_9O$ |
| 213 | 21 | 287-$C_4H_{10}O$ 269-$C_4H_8$ |

TABLE III

PROTON MAGNETIC RESONANCE SPECTRUM OF 1,4'-DIHYDROXY-3-n-PENTYL-6,6,9-TRIMETHYL-6a,7,10,10a-TETRAHYDRODIBENZO[b,d]PYRAN

| Assignment | Chemical Shift (S)* |
|---|---|
| 6α—$CH_3$ | 1.09 (s) |
| —CHOH—$CH_3$ | 1.18 (d, J= 6 Hz) |
| 6β—$CH_3$ | 1.36 (s) |
| 9-$CH_3$ | 1.69 (br s) |
| Ph$CH_2$ | 2.45 (t, J=7.5 Hz) |
| 10a-H | 2.71 (m) |
| 10α-H | 3.24 (dd, J=16 Hz, 4Hz) |
| —$CH_2$—CHOH—$CH_3$ | 3.82 (sextet, J=6 Hz) |
| 8-H | 5.41 (m) |
| 2-H | 6.09 (d, J=1.8 Hz) |
| 4-H | 6.24 (d, J=1.8 Hz) |

* The chemical shifts are given in parts per million. Abbreviations: s=singlet, d=doublet, t=triplet, m=multiplet, dd=doublet or doublets, br=broad.

The present invention includes within its scope pharmaceutical compositions comprising, as an active ingredient, at least one of the compounds of this invention in association with a pharmaceutically acceptable carrier or diluent. The compounds of this invention exhibit both oral and parenteral activity and can be formulated in dosage forms for oral, parenteral or rectal administration.

Solid dosage forms for oral administration include capsules, tablets, pills, powders and granules. In such solid dosage forms, the active compound is admixed with at least one inert diluent such as sucrose, lactose or starch. Such dosage forms can also comprise, as is normal practice, additional substances other than inert diluents, e.g., lubricating agents such as magnesium stearate, and sweetening and flavoring agents. Tablets and pills can additionally be prepared with enteric coatings.

Liquid dosage forms for oral administration include pharmaceutically acceptable emulsions, solutions suspensions, syrups and elixris containing inert diluents commonly used in the art, such as water. Besides inert diluents, such compositions can also include adjuvants, such as wetting agents, emulsifying and suspending agents and sweetening, flavoring and perfuming agents.

Preparations according to this invention for parenteral administration include sterile aqueous or non-aqueous solutions, suspensions or emulsions. Examples of non-aqueous solvents or vehicles are propylene glycol, polyethylene glycol, vegetable oils, such as olive oil, and injectable organic esters such as ethyl oleate. Such dosage forms may also contain adjuvants such as preserving, wetting, emulsifying and dispersing agents. They may be sterilized by, for example, filtration through a bacteria-retaining filter, by incorporating sterilizing agents into the compositions, by irradiating the compositions, or by heating the compositions. They can also be manufactured in the form of sterile solid compositions which can be dissolved in sterile water, or some other sterile injectable medium immediately before use.

Compositions for rectal administration are suppositories which may contain in addition to the active substance, excipients such as cocoa butter or a suppository wax.

The dosage of active ingredient in the compositions of this invention may be varied; however, it is necessary that the amount of the active ingredient shall be such that a suitable dosage form is obtained. The selected dosage depends upon the desired therapeutic effect, on the route of administration and on the duration of the treatment. Generally, dosage levels of between 0.5 and 100 mg./kg. of body weight daily are administered to patients in need of treatment of symptoms of depression. It is preferred to administer the composition 3 or 4 times daily at dosages of between 0.5 and 25 mg./kg. of body weight.

The following example further illustrates the pharmaceutical compositions which are a feature of this invention:

EXAMPLE 3

Tablets weighing 200 mg. and having the following composition are prepared by standard tableting procedures:

| Ingredient | Mg. |
| --- | --- |
| 1,4'-dihydroxy-3-n-pentyl-6,6,9-trimethyl-6a,7,10,10a-tetrahydrodibenzo[b,d]pyran | 100 |
| Starch | 94 |
| Colloidal silica | 5 |
| Magnesium stearate | 1 |

It will be understood by those skilled in the art that the above composition can contain any of the compounds of this invention.

We claim:

1. A method of treating the symptoms of depression comprising administering a therapeutically effective amount of 1,4'-dihydroxy-3-n-pentyl-6,6,9-trimethyl-6a,7,10,10a-tetrahydrodibenzo[b,d]pyran to a patient in need of such treatment.

2. A method in accordance with claim 1 wherein a compound is administered in a dosage of from 0.5 to 100 mg./kg. of body weight daily.

3. A pharmaceutical composition in unit dosage form for treatment of symptoms of depression, comprising a therapeutically effective amount of 1,4'-dihydroxy-3-n-pentyl-6,6,9-trimethyl-6a,7,10,10a-tetrahydrodibenzo[b,d]pyran and a pharmaceutically acceptable carrier or diluent.

* * * * *

UNITED STATES PATENT OFFICE
CERTIFICATE OF CORRECTION

PATENT NO. : 3,864,492
DATED : February 4, 1975
INVENTOR(S) : Earl Elmer Fager and Norman Earl Wideburg It is certified that error appears in the above-identified patent and that said Letters Patent are hereby corrected as shown below:

Column 6, Table III, delete the table in its entirety and substitute therefor:

--PROTON MAGNETIC RESONANCE SPECTRUM OF 1,4'-DIHYDROXY-3-n-PENTYL-6,6,9-TRIMETHYL-6a,7,10,10a-TETRAHYDRODIBENZO[b,d]PYRAN

| Assignment | Chemical Shift (S)* |
|---|---|
| 6α-CH$_3$ | 1.09 (s) |
| -CHOH-C$\underline{H}_3$ | 1.18 (d, $\underline{J}$= 6 Hz) |
| 6β-CH$_3$ | 1.36 (s) |
| 9-CH$_3$ | 1.69 (br s) |
| PhC$\underline{H}_2$ | 2.45 (t, $\underline{J}$=7.5 Hz) |
| 10a-H | 2.71 (m) |
| 10α-H | 3.24 (dd, $\underline{J}$=16 Hz, 4Hz) |
| -CH$_2$-C$\underline{H}$OH-CH$_3$ | 3.82 (sextet, $\underline{J}$=6 Hz) |
| 8-H | 5.41 (m) |
| 2-H | 6.09 (d, $\underline{J}$=1.8 Hz) |
| 4-H | 6.24 (d, $\underline{J}$=1.8 Hz) |

* The chemical shifts are given in parts per million
Abbreviations: s=singlet, d=doublet, t=triplet, m=multiplet, dd=doublet or doublets, br=broad.--

Signed and Sealed this sixteenth Day of March 1976

[SEAL]

Attest:

RUTH C. MASON
Attesting Officer

C. MARSHALL DANN
Commissioner of Patents and Trademarks